(12) United States Patent
Corbin, Jr.

(10) Patent No.: US 11,027,753 B1
(45) Date of Patent: Jun. 8, 2021

(54) SYSTEMS, DEVICES, AND/OR METHODS FOR MANAGING FENCING

(71) Applicant: Wellington Corbin, Jr., Bridgewater, VA (US)

(72) Inventor: Wellington Corbin, Jr., Bridgewater, VA (US)

( * ) Notice: Subject to any disclaimer, the term of this patent is extended or adjusted under 35 U.S.C. 154(b) by 0 days.

(21) Appl. No.: 17/006,966

(22) Filed: Aug. 31, 2020

(51) Int. Cl.
*B61B 1/02* (2006.01)
*B61D 3/18* (2006.01)

(52) U.S. Cl.
CPC .............. *B61B 1/02* (2013.01); *B61D 3/187* (2013.01)

(58) Field of Classification Search
CPC ................... B61B 1/02; B61D 3/187
See application file for complete search history.

(56) References Cited

U.S. PATENT DOCUMENTS

| | | | | |
|---|---|---|---|---|
| 4,929,132 A | * | 5/1990 | Yeates ...................... | B61D 3/10 410/45 |
| 5,246,321 A | * | 9/1993 | Hesch .................. | B60P 1/6409 105/416 |
| 5,452,664 A | * | 9/1995 | Richmond ............. | B61D 3/184 105/4.1 |
| 5,622,115 A | * | 4/1997 | Ehrlich .................... | B61D 3/04 105/215.1 |
| 5,743,192 A | * | 4/1998 | Saxton .................. | B60T 13/406 105/355 |
| 5,901,649 A | * | 5/1999 | Hathaway ............... | B61B 1/005 104/29 |
| 7,255,047 B1 | * | 8/2007 | Coslovi .................. | B61D 3/187 105/355 |
| 8,181,577 B2 | * | 5/2012 | Bounds .................. | E01B 29/17 104/2 |
| 8,365,674 B2 | * | 2/2013 | Banwart .............. | B61D 47/005 105/3 |
| 10,787,184 B2 | * | 9/2020 | Banwart .............. | B61D 47/005 |
| 2003/0015116 A1 | * | 1/2003 | Engle ..................... | B61D 3/187 105/238.1 |
| 2014/0133954 A1 | * | 5/2014 | Da Guia Nunes ....... | B61G 5/02 414/812 |

* cited by examiner

*Primary Examiner* — Jason C Smith
(74) *Attorney, Agent, or Firm* — Dale Jensen, PLC; Dale Jensen

(57) ABSTRACT

Certain exemplary embodiments can provide a railroad grid, a set of railcars, and a set of stations. The railroad grid comprises a set of tracks. The set of tracks can have a spacing between outer rail center lines of at least 50 feet. At least one of the set of railcars can be constructed to receive a set of tractor and trailer pairs.

12 Claims, 10 Drawing Sheets

SYSTEMS, DEVICES, AND/OR METHODS FOR MANAGING FENCING

BRIEF DESCRIPTION OF THE DRAWINGS

A wide variety of potential practical and useful embodiments will be more readily understood through the following detailed description of certain exemplary embodiments, with reference to the accompanying exemplary drawings in which.

and

Figure 10:
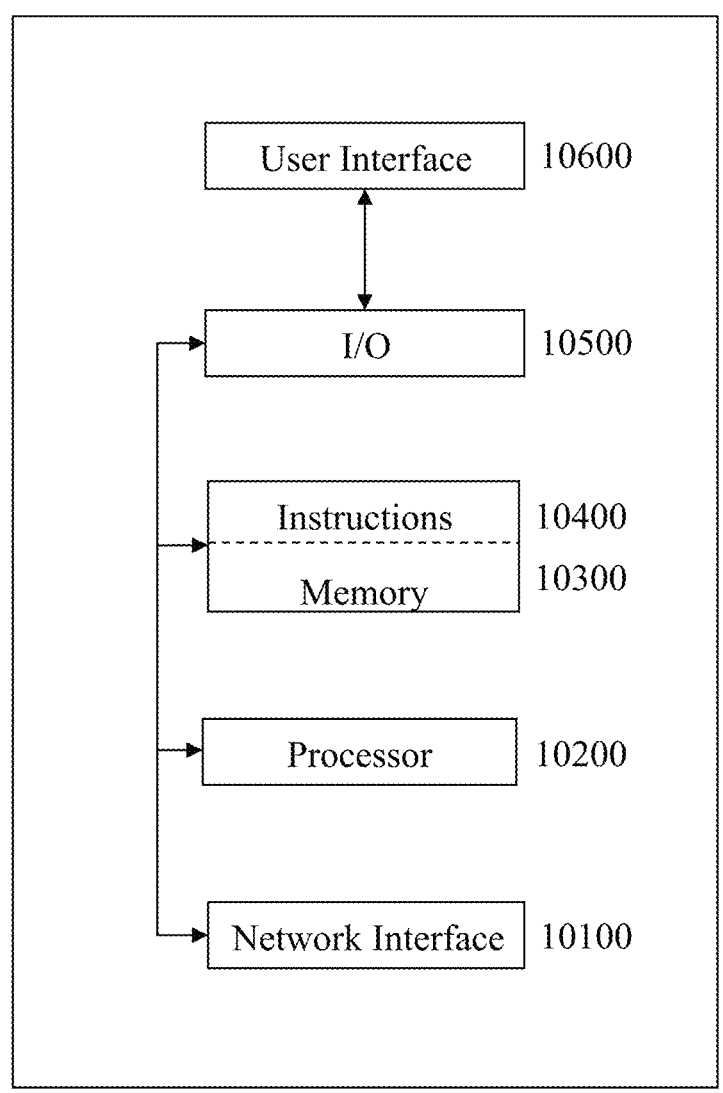

FIG. 10 is a block diagram of an exemplary embodiment of an information device 10000.

DETAILED DESCRIPTION

Certain exemplary embodiments can provide a railroad grid, a set of railcars, and a set of stations. The railroad grid comprises a set of tracks. The set of tracks can have a spacing between outer rail center lines of at least 50 feet. At least one of the set of railcars can be constructed to receive a set of tractor and trailer pairs.

Figure 1:
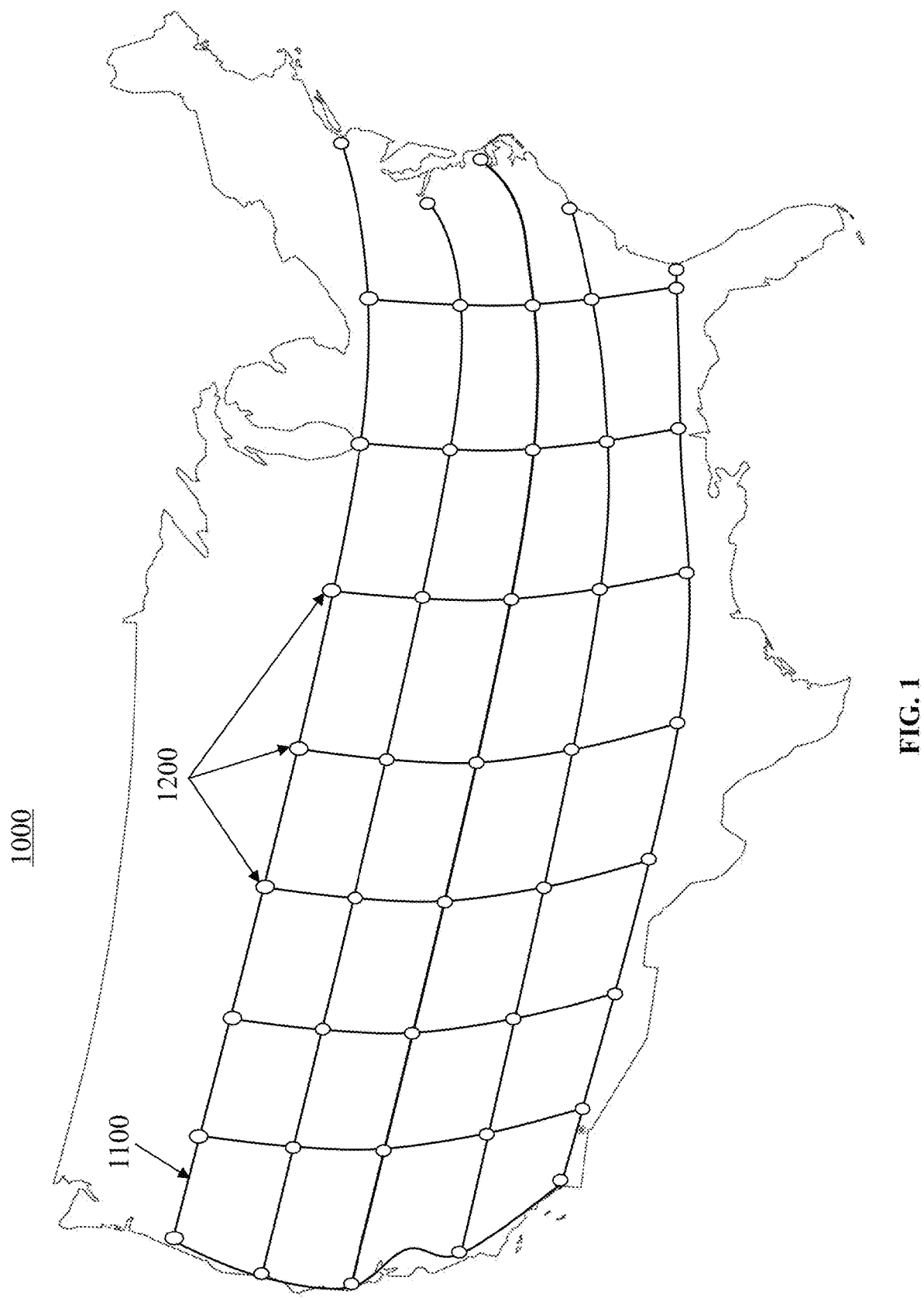
FIG. 1 is a diagram of an exemplary embodiment of a railroad grid map 1000.

FIG. 1 is a diagram of an exemplary embodiment of a railroad grid map 1000, which comprises a railroad grid 1100 and a set of stations 1200. Certain exemplary embodiments can allow transport from San Francisco to New York in approximately thirty-two hours with just a single transfer from a first train to a second train. Certain exemplary embodiments can allow transport from Galveston to New York in approximately twenty hours with just a single transfer from a first train to a second train.

In certain exemplary embodiments, grid lines can be separated by a distance of approximately 300 miles.

Because of train weights, railroad tracks will generally be under existing roads.

Such can be provided for by installing overpasses on roads and/or creating tunnels for the railroad.

Certain exemplary embodiments can be referred to as an "overland ferry system".

Certain exemplary embodiments can improve the efficiency and effectiveness of transporting freight across the United States. Exemplary systems can reduce traffic demands on paved roads.

Certain exemplary embodiments provide relatively direct runs between system nodes and destination points. Certain exemplary embodiments can be constructed to operate at speeds in excess of 150 miles per hour between railway system nodes. Certain exemplary embodiments provide a long term infrastructure that allows for efficient transportation of materials and goods for over a century to come.

As an example, a fully developed system allows for movement of freight and/or people from Florida to Maine with approximately five stops. Such trips can be made in approximately sixteen hours.

Moving at a speed in excess of 150 miles per hour and making approximately five stops, provides for stops of a reasonable duration (e.g., approximately 12-15 minutes per stop) to load and unload trucks, vehicles, freight, and/or passengers. In certain exemplary embodiments, drivers travel with vehicles to be driven off of railcars.

When a train pulls into a station loading and unloading dock, drivers move trucks and/or vehicles on and off of railcars. Protocols involve vehicles unloading from railcars on a first side of the train; with loading of railcars taking place from a second side of the train (i.e., one way traffic is utilized at the station loading and unloading dock).

Figure 2:
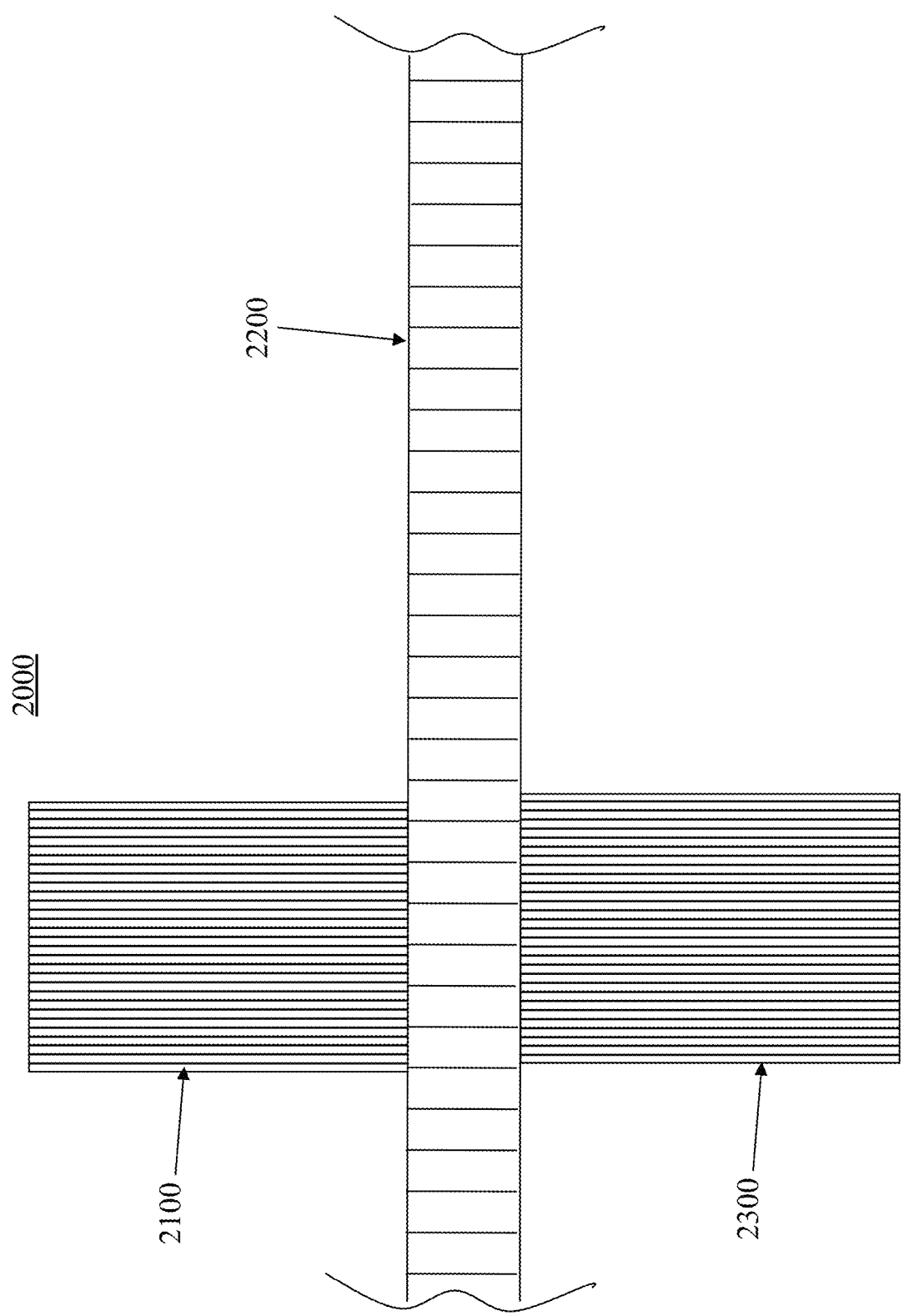
FIG. 2 is a plan view of an exemplary embodiment of a station 2000.

FIG. 2 is a plan view of an exemplary embodiment of a station 2000. Certain exemplary embodiments provide a guide system (e.g., utilizing pipes) to keep trucks, vehicles, and/or freight aligned. Utilizing guides can reduce accident risks. Certain exemplary embodiments comprise an unloading dock 2100, rail tracks 2200, and a loading dock 2300.

Figure 3:
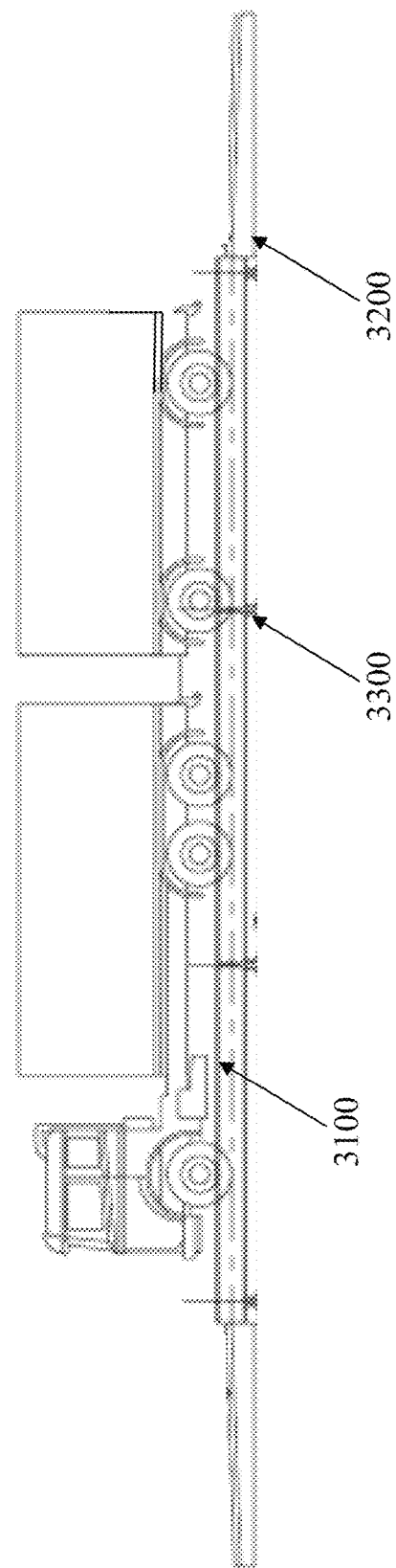
FIG. 3 is a sectional view of an exemplary embodiment of a system 3000.

FIG. 3 is a sectional view of an exemplary embodiment of a system 3000. Railcars or docks can comprise guides 3100, which in certain exemplary embodiments can comprise pipes. Guides 3100 are constructed to guide wheels of trucks and/or other vehicles transported on the overland ferry system. Certain exemplary embodiments can utilize a concrete base at docks for loading and unloading. The concrete base provides for stability and long-term system life. Once a truck and/or other vehicle is placed on a railcar, certain exemplary embodiments can utilize an automatic lock 3300. Automatic lock 3300 restrains trucks and/or other vehicles from moving once loaded on the railcar.

Certain exemplary embodiments can transport trucks, vehicles, freight, and/or passengers from coast to coast in significantly less time than prior art railroad systems. Transported items travel without any stops of significant length. Certain exemplary embodiments transport trucks, vehicles, freight, and/or passengers utilizing less fuel than over the road transportation.

Passengers can be transported in railcars with amenities such as food, rest room facilities, showers, sleeping quarters, and/or recreational facilities, etc.

An exemplary train can be approximately five miles long and comprise approximately 52 train cars. Such an exemplary train can transport 520 tractor-trailers with 100 ft long train cars.

Another exemplary train can be approximately ten miles long and can transport over 1,000 tractor-trailers. Railcars can be made even longer than ten miles long.

Certain exemplary embodiments can result in transport systems that are more energy efficient and create less pollution than alternative systems. Certain exemplary embodiments reduce highway traffic along with associated wear and tear.

Rates for transportation of tractor-trailers, vehicles, freight, and/or people can be determined based upon fuel savings for an equivalent trip over paved highways.

Figure 4:
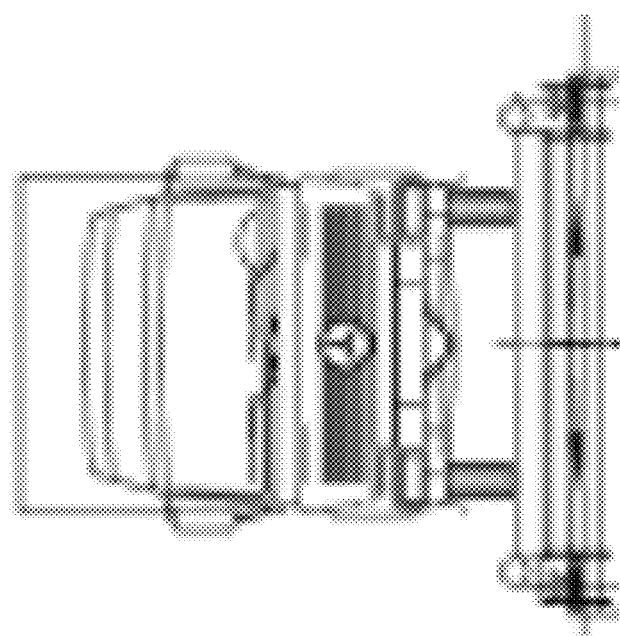
FIG. 4 is a frontal view of an exemplary embodiment of a system 4000.

FIG. 4 is a frontal view of an exemplary embodiment of a system 4000.

Figure 5:
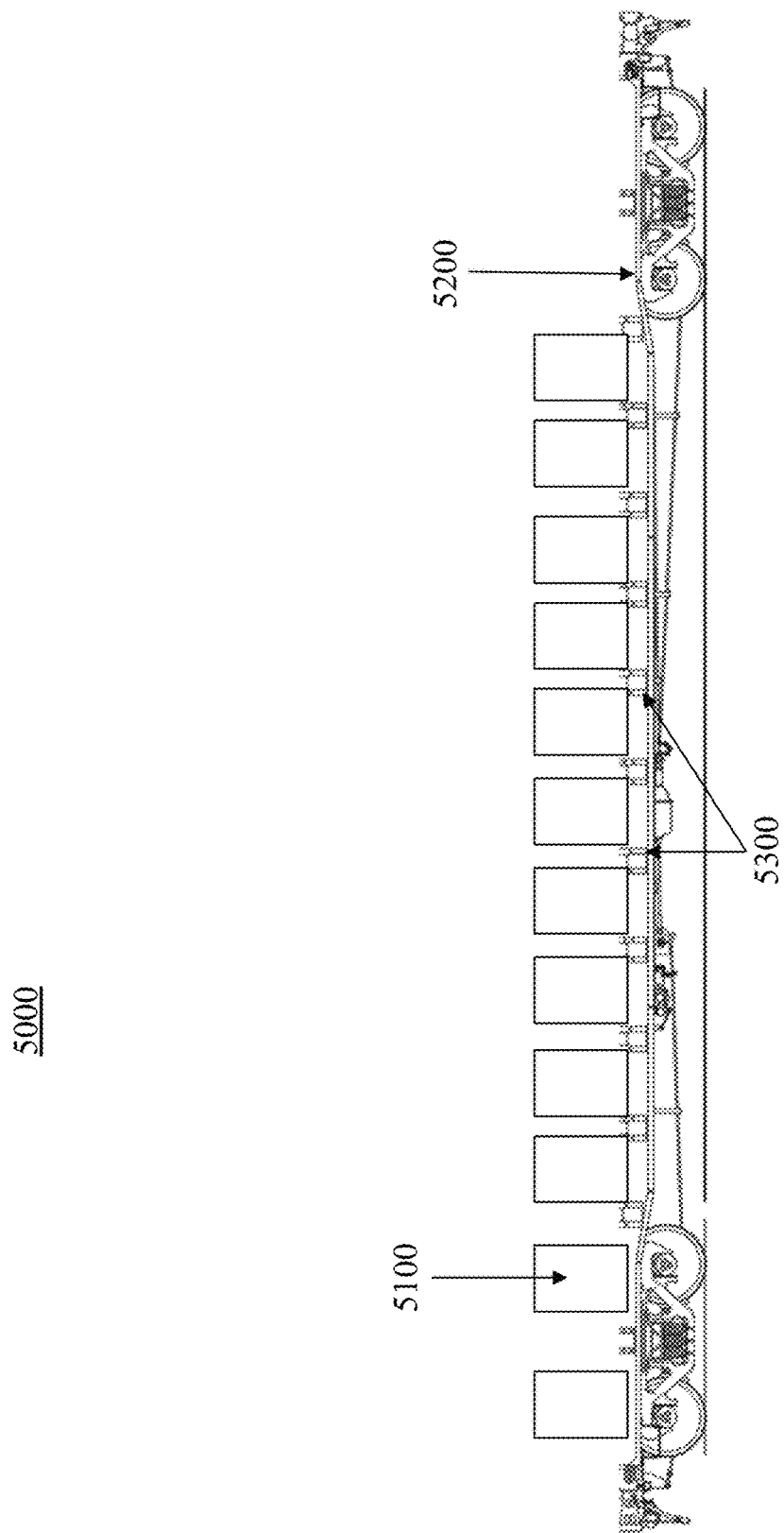
FIG. 5 is a sectional view of an exemplary embodiment of a system 5000.

FIG. 5 is a sectional view of an exemplary embodiment of a system 5000, which illustrates a set of tractor-trailers 5100 positioned on a railcar 5200. The illustrated embodiment shows twelve tractor-trailers 5100 positioned on a railcar

5200. Other embodiments can be sized to hold more or less counts of tractor-trailers 5100. In certain exemplary embodiments, railcar 5200 can be between 100 feet and 150 feet in length and have a width between 65 feet and 75 feet. Other embodiments can be constructed to transport passenger cars, pickup trucks, and/or vans, etc. Passenger car applications can involve railcars that have two levels of cars. Depending on the configuration and size of the railcar, between approximately 47 and 76 passenger cars, pickup trucks, and/or vans, etc. can be transported on a single railcar.

System 5000 can comprise a set of grooves 5300.

Figure 6:
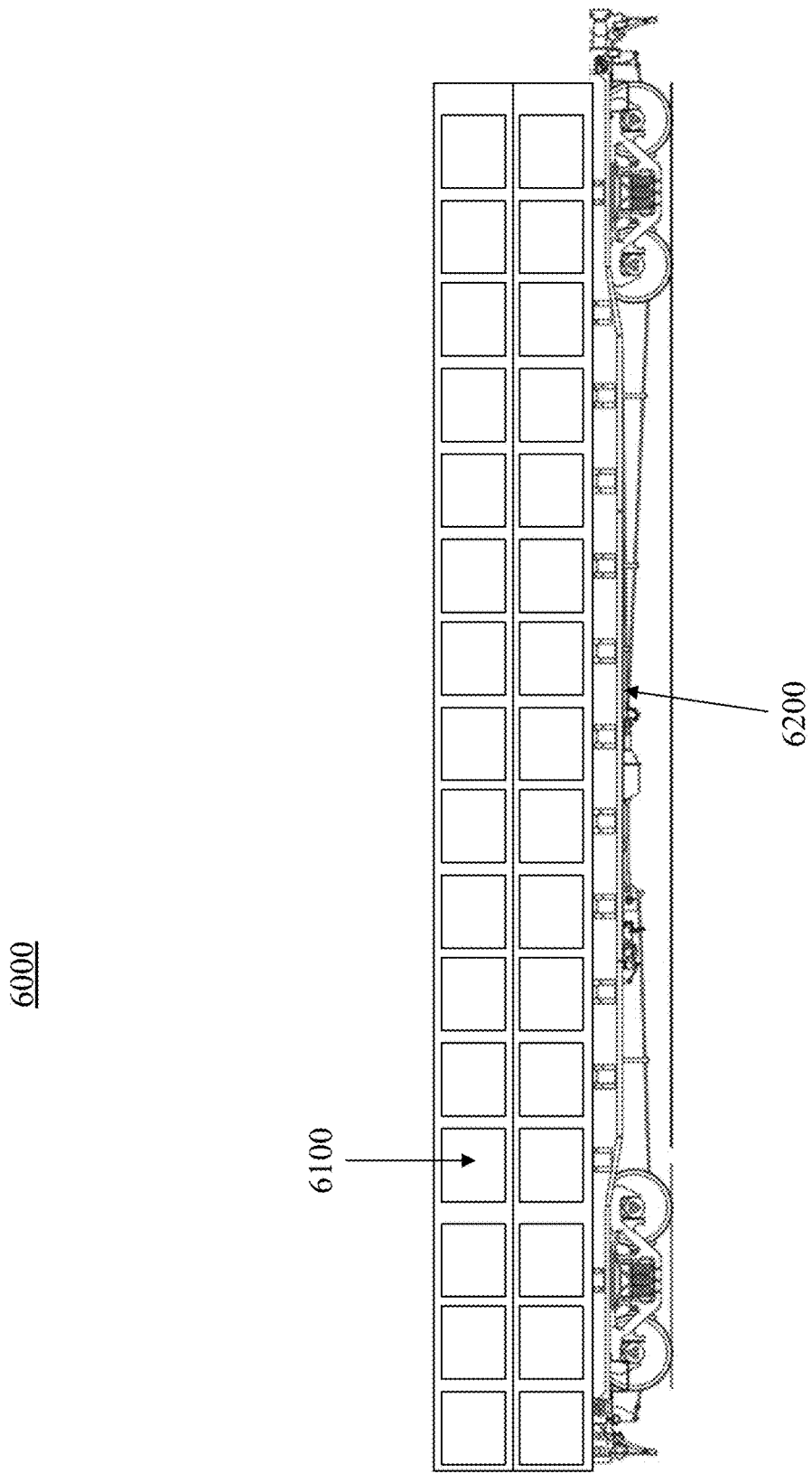
FIG. 6 is a sectional view of an exemplary embodiment of a system 6000.

FIG. 6 is a sectional view of an exemplary embodiment of a system 6000, which comprises a passenger car 6200 with a plurality of passenger compartments 6100.

Figure 7:
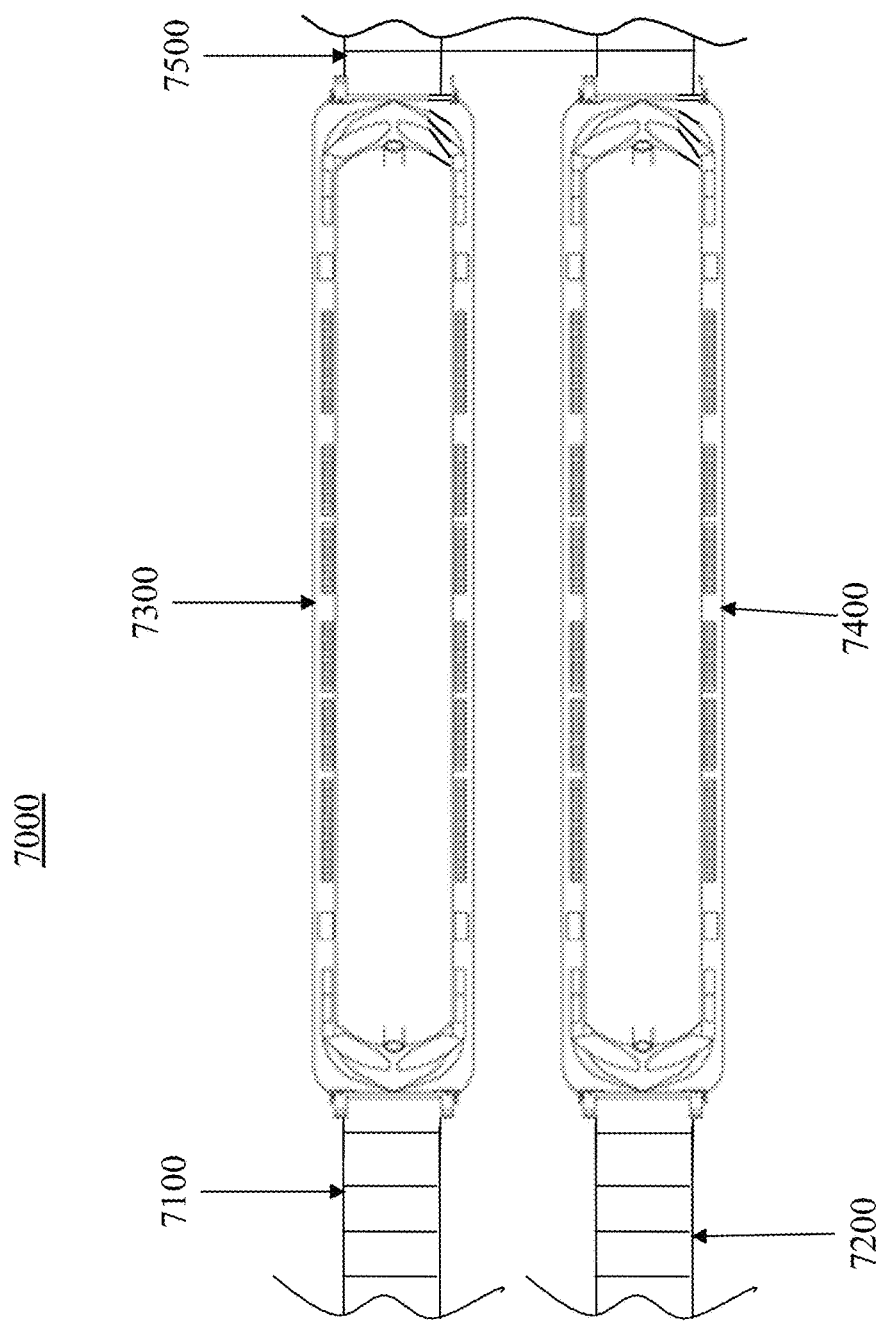
FIG. 7 is a plan view of an exemplary embodiment of a system 7000.

FIG. 7 is a plan view of an exemplary embodiment of a system 7000. Because of the width of railcars, certain exemplary systems utilize a first railroad track 7100 and a second railroad track 7200. First railroad track 7100 is substantially parallel to second railroad track 7200. System 7000 comprises a first engine 7300 and a second engine 7400, both of which are coupled to a railcar 7500 of a plurality of railcars. A count of engines for a given train can vary depending upon the length and weight of the train to be pulled.

Figure 8:
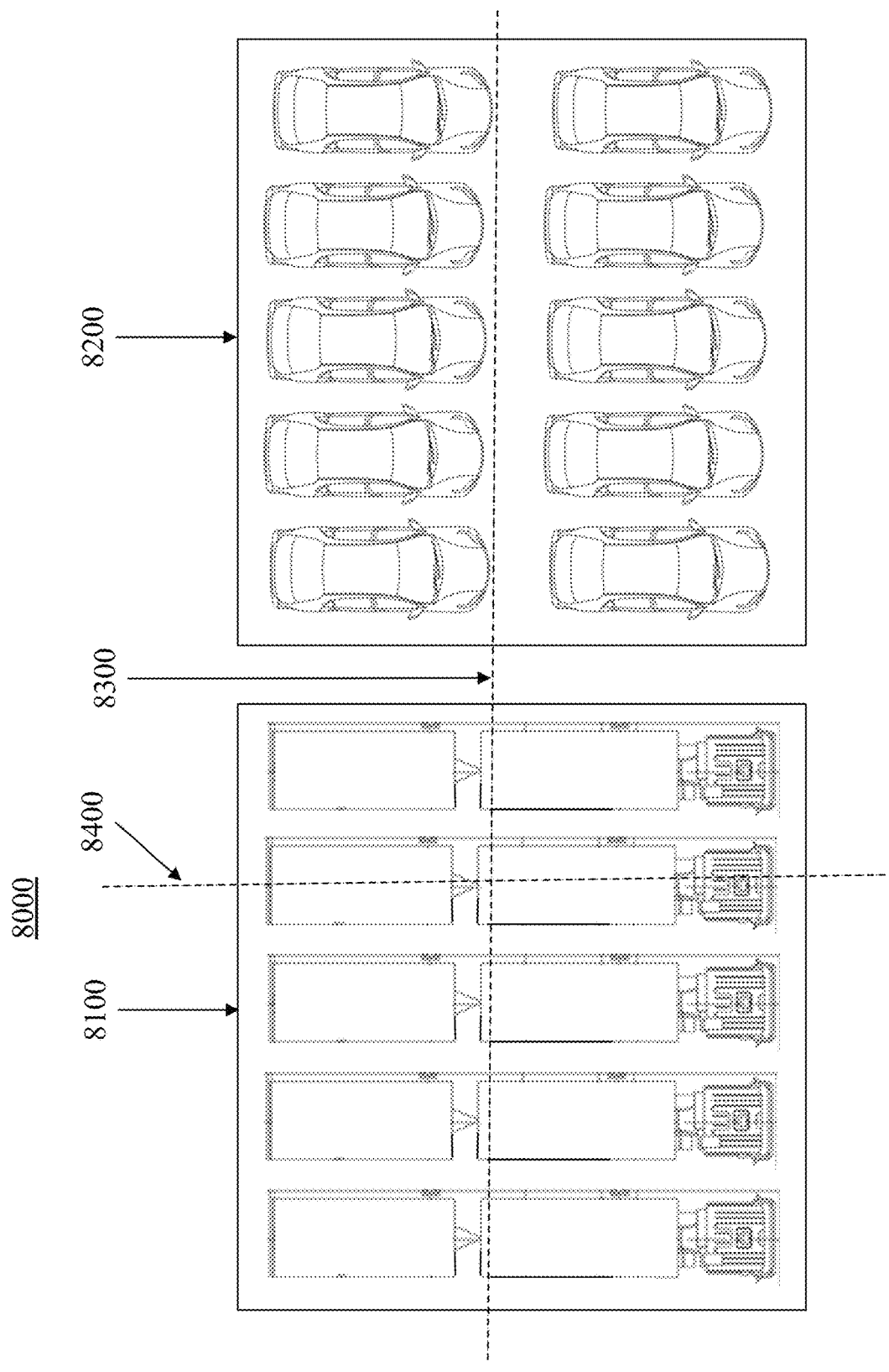
FIG. 8 is a plan view of an exemplary embodiment of a system 8000.

FIG. 8 is a plan view of an exemplary embodiment of a system 8000, which comprises a tractor-trailer rail car 8100 and a passenger car railcar 8200.

Certain exemplary systems comprise a railroad grid (see, railroad grid 1100 of FIG. 1). The railroad grid comprising a set of tracks, the set of tracks having a spacing between outer rail centerlines of at least 50 feet. The set of tracks can comprise two pair of tracks (see, first railroad track 7100 and second railroad track 7200 of FIG. 7).

Certain exemplary systems comprise a set of stations (see set of stations 1200 of FIG. 1). Each station of set of the set of stations can have a platform constructed such that each tractor and trailer pair of the tractor and trailer set drives directly off of a railcar of the set of railcars. The railroad grid can comprise a set of railroad lines running in predominantly north and south directions. The railroad grid can comprise a set of railroad lines running in predominantly east and west directions. The railroad grid can comprise a set of junctions, wherein the each of the set of junctions comprises a station of the set of stations.

The platform can comprises a set of guides. The set of guides constructed to guide tires of a tractor and trailer as the tractor and trailer exits a railcar of the set of railcars.

Certain exemplary systems comprise a set of railcars (see tractor-trailer rail car 8100 and passenger car railcar 8200 of FIG. 8). At least one of the set of railcars can be constructed to receive a set of tractor and trailer pairs. Each tractor and trailer pair can be positioned on each railcar of the set of railcars with a longitudinal axis (see, longitudinal axis 8400 of FIG. 8) that is substantially perpendicular to a direction of travel (see, direction of travel 8300 of FIG. 8) of tracks of the railroad grid.

Each of the set of railcars can be at least 100 feet long. A railcar of the set of railcars can be a passenger railcar. A railcar of the set of railcars can be a passenger railcar that comprises a lower row of rooms on a first level and an upper row of rooms on a second level. A railcar of the set of railcars is constructed to transport a set of automobiles. A railcar of the set of railcars can define a set of grooves (see, set of grooves 5300 of FIG. 3) that are constructed to engage with tires of a tractor and trailer positioned on the railcar of the set of railcars. The set of grooves can be positioned to restrain motion of the tractor and trailer relative to the railcar.

A railcar of the set of railcars can define a set of pipes (see, guides 3100 of FIG. 3) that are constructed to engage with tires of a tractor and trailer positioned on the railcar of the set of railcars, the set of pipes positioned to restrain motion of the tractor and trailer relative to the railcar.

Figure 9:
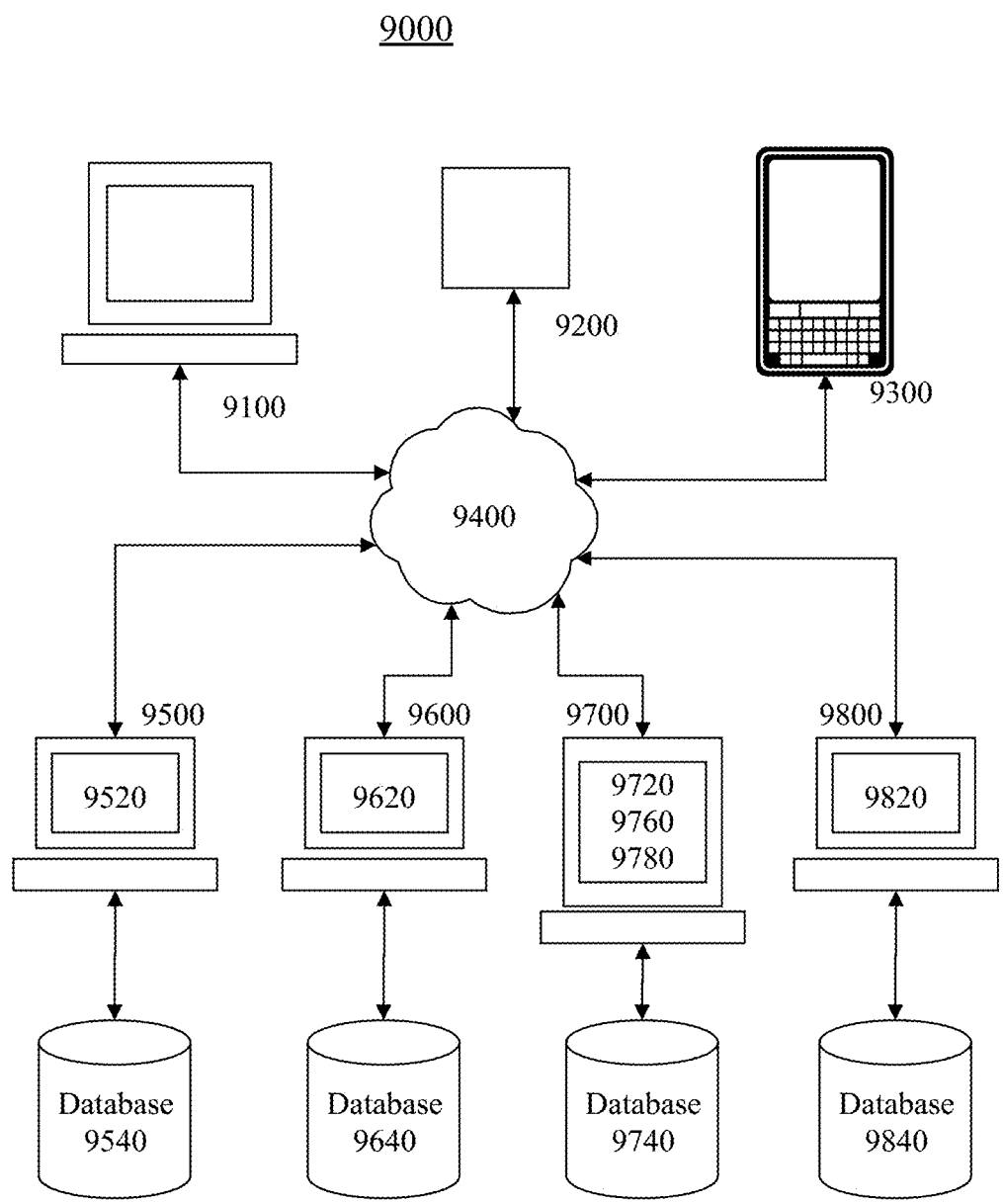
FIG. 9 is a block diagram of an exemplary embodiment of a system 9000.

FIG. 9 is a block diagram of an exemplary embodiment of a system 9000, which can comprise a smartphone 9300, an information device 9100, tablet 9200, a network 9400, a first server 9500, a second server 9600, a third server 9700, and a fourth server 9800. First server 9500 can comprise a first user interface 9520 and can be coupled to a first database 9540. Second server 9600 can comprise a second user interface 9620 and can be coupled to a second database 9640. Third server 9700 can comprise a third user interface 9720, a processor 9760, machine instructions 9780, and can be coupled to a third database 9740. Fourth server 9800 can comprise a fourth user interface 9820 and can be coupled to a fourth database 9840. Any of the methods and/or steps thereof can be carried out in whole or in part by tablet 9200, smartphone 9300, information device 9100 and/or first server 9500. Second server 9600, third server 9700, and/or fourth server 9800 can each be associated with implementation of a system via which rail transportation systems are provided and controlled. In certain exemplary embodiments, system 9000 can be used to implement one or more methods disclosed herein.

Exemplary information devices can be used to plan and control rail systems. For example, shippers can make reservations with a railroad entity to transport tractor-trailers or other vehicles. A central database stores such reservations and calculates resources available and/or to be added in order to accommodate the reservation. An information device can reserve a specific space on a specific railcar for each item and/or person to be traveling on the train. If space is not available on railcars that had been previously planned for use, one or more additional railcars can be requested by the information device. The information device can automatically communicate reservations and resource requests to stations such that railcars can be deployed to accommodate reservations.

The information device can automatically determine if reservations are such that a particular railcar on a train can be removed from the train at a particular station if reservation demand is insufficient to warrant use of the railcar.

The information device specifies occupancy by tractor-trailers, equipment, freight, and/or people at given locations on a given train at a given station on the railroad grid.

The information device can automatically calculate power requirements for a given train at a given point on the railroad grid and can allocate engines to accommodate a count of railcars and/or weight of a particular train. The information can be constructed to alert customers of the railroad of locations, approximate schedules, and/or issues concerning a shipment related to specific customers.

Each train can be equipped with GPS transceivers and wireless communications systems such that a location of a given train is automatically communicated to an information device on a periodic or continuous basis. The information device can automatically check the railroad grid for interferences and/or schedule deviations an promptly communicate any such deviations to concerned parties.

The information device can be constructed to render maps and other information indicating train location and status on a substantially continuous basis.

FIG. 10 is a block diagram of an exemplary embodiment of an information device 10000, which in certain operative embodiments can comprise, for example, tablet 9200 and information device 9100 of FIG. 1. Information device 10000 can comprise any of numerous circuits and/or components, such as for example, one or more network interfaces 10100, one or more processors 10200, one or more memories 10300 containing instructions 10400, one or more input/output (I/O) devices 10500, and/or one or more user interfaces 10600 coupled to I/O device 10500, etc.

In certain exemplary embodiments, via one or more user interfaces 2600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.
activity—an action, act, step, and/or process or portion thereof
adapter—a device used to effect operative compatibility between different parts of one or more pieces of an apparatus or system.
and/or—either in conjunction with or in alternative to.
apparatus—an appliance or device for a particular purpose
associate—to join, connect together, and/or relate.
automatically—acting or operating in a manner essentially independent of external influence or control. For example, an automatic light switch can turn on upon "seeing" a person in its view, without the person manually operating the light switch.
automobile—a wheeled motor vehicle constructed for transportation.
can—is capable of, in at least some embodiments.
cause—to produce an effect.
centerline—a line through a center of something following an axis of symmetry.
circuit—an electrically conductive pathway and/or a communications connection established across two or more switching devices comprised by a network and between corresponding end systems connected to, but not comprised by the network.
comprising—including but not limited to.
configure—to make suitable or fit for a specific use or situation.
connect—to join or fasten together.
constructed to—made to and/or designed to.
convert—to transform, adapt, and/or change.
couple—to physically join in some fashion.
coupleable—capable of being joined, connected, and/or linked together.
create—to bring into being.
data—distinct pieces of information, usually formatted in a special or predetermined way and/or organized to express concepts.
define—to establish the outline, form, or structure of
determine—to obtain, calculate, decide, deduce, and/or ascertain.
device—a machine, manufacture, and/or collection thereof.
direction—a line along which something moves.
directly—substantially without an intervening component or intervening space.
drive—to impart a forward motion to by physical force.
engage—to be in contact and interact with.
estimate—to calculate and/or determine approximately and/or tentatively.
exit—to leave a railcar.
generate—to create, produce, give rise to, and/or bring into existence.
grid—a network of spaced horizontal and perpendicular lines as viewed on a map.
groove—a narrow channel.
guide—(n) an object that constrains motion to a desired direction; (v) to constrains motion to a desired direction.
haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.
having—comprising a characteristic or attribute.
information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.
initialize—to prepare something for use and/or some future event.
input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

install—to connect or set in position and prepare for use.

junction—a location of intersection of two railroad lines.

level—an defined elevation of a railcar portion accessible by a human.

longitudinal axis—a straight line defined parallel to an object's length and passing through a centroid of the object.

lower—at a reduced elevation relative to the earth compared to something else.

machine instructions—directions adapted to cause a machine, such as an information device, to perform one or more particular activities, operations, or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine readable medium—a physical structure from which a machine can obtain data and/or information. Examples include a memory, punch cards, etc.

may—is allowed and/or permitted to, in at least some embodiments.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

motion—a process via which something changes position from one location to another.

network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

outer—situated on an edge of a track.

packet—a discrete instance of communication.

passenger—a human that is transported via a railroad.

perpendicular—meeting at substantially right angles.

pipe—a tubular section or hollow cylinder, usually but not necessarily of circular cross-section.

platform—an area alongside a railway track providing access to trains.

plurality—the state of being plural and/or more than one.

position—a location occupied by a physical object.

predetermined—established in advance.

predominantly—for the most part.

probability—a quantitative representation of a likelihood of an occurrence.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

project—to calculate, estimate, or predict.

provide—to furnish, supply, give, and/or make available.

rail—a bar of metal forming a track for a railroad.

railcar—a vehicle constructed for the carrying of cargo or passengers on a rail transport system.

railroad—a system constructed to transfer passengers and goods on wheeled vehicles running on rails, which rails are located on tracks.

railroad line—a track and roadbed of a railway.

receive—to get, take, acquire, and/or obtain.

recommend—to suggest, praise, commend, and/or endorse.

relative to—in comparison with.

render—to make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

repeatedly—again and again; repetitively.

request—to express a desire for and/or ask for.

restrain—to limit motion of something.

room—a walled part of a railcar.

row—a set of things arranged along a line.

run—to lie in or take a certain direction.

select—to make a choice or selection from alternatives.

set—a related plurality.

signal—information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

space—to set apart by a predetermined distance.

station—a railway facility or area where trains regularly stop to load or unload passengers or freight or both.

store—to place, hold, and/or retain.

substantially—to a great extent or degree.

support—to bear the weight of, especially from below.

system—a collection of mechanisms, devices, machines, articles of manufacture, processes, data, and/or instructions, the collection designed to perform one or more specific functions.

tire—a ring-shaped component that surrounds a wheel's rim to transfer a vehicle's load from the axle through the wheel to the ground and to provide traction on the surface over which the wheel travels.

track—substantially parallel rails of a railroad.

tractor and trailer—a combination of a heavy-duty towing engine that provides motive power for hauling a towed or trailered load in combination with, and coupled to, a non-automotive vehicle without a front axle.

transmit—to send, provide, furnish, and/or supply.

transport—to carry, move, or convey from one place to another.

travel—to move in a given direction or path.

upper—above when a device is pointed skyward.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

via—by way of and/or utilizing.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A system comprising:
a railroad grid, the railroad grid comprising a set of tracks, the set of tracks having a spacing between outer rail centerlines of at least 50 feet;
a set of railcars, at least one of the set of railcars constructed to receive a set of tractor and trailer pairs, each tractor and trailer pair positioned on each railcar of the set of railcars with a longitudinal axis that is substantially perpendicular to a direction of travel of tracks of the railroad grid; and
a set of stations, each station of set of the set of stations having a platform constructed such that each tractor and trailer pair of the tractor and trailer set drives directly off of a railcar of the set of railcars.

2. The system of claim 1, wherein:
the railroad grid comprises a set of railroad lines running in predominantly north and south directions.

3. The system of claim 1, wherein:
the railroad grid comprises a set of railroad lines running in predominantly east and west directions.

4. The system of claim 1, wherein:
the railroad grid comprises a set of junctions, wherein the each of the set of junctions comprises an station of the set of stations.

5. The system of claim 1, wherein:
each of the set of railcars is at least 100 feet long.

6. The system of claim 1, wherein:
a railcar of the set of railcars is a passenger railcar.

7. The system of claim 1, wherein:
a railcar of the set of railcars is a passenger railcar that comprises a lower row of rooms on a first level and an upper row of rooms on a second level.

8. The system of claim 1, wherein:
a railcar of the set of railcars is constructed to transport a set of automobiles.

9. The system of claim 1, wherein:
the set of tracks comprises two pair of tracks.

10. The system of claim 1, wherein:
a railcar of the set of railcars defines a set of grooves that are constructed to engage with tires of a tractor and trailer positioned on the railcar of the set of railcars, the set of grooves positioned to restrain motion of the tractor and trailer relative to the railcar.

11. The system of claim 1, wherein:
a railcar of the set of railcars defines a set of pipes that are constructed to engage with tires of a tractor and trailer positioned on the railcar of the set of railcars, the set of pipes positioned to restrain motion of the tractor and trailer relative to the railcar.

12. The system of claim 1, wherein:
the platform comprises a set of guides, the set of guides constructed to guide tires of a tractor and trailer as the tractor and trailer exits a railcar of the set of railcars.

* * * * *

UNITED STATES PATENT AND TRADEMARK OFFICE
CERTIFICATE OF CORRECTION

PATENT NO. : 11,027,753 B1  
APPLICATION NO. : 17/006966  
DATED : June 8, 2021  
INVENTOR(S) : Wellington Corbin, Jr.

Page 1 of 1

It is certified that error appears in the above-identified patent and that said Letters Patent is hereby corrected as shown below:

On the Title Page

Item (54) and in the Specification, Column 1 Lines 1-2:
"SYSTEMS , DEVICES , AND/OR METHODS FOR MANAGING FENCING"
Should read:
"SYSTEMS , DEVICES , AND/OR METHODS FOR MANAGING FREIGHT"

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*